US012754204B2

(12) United States Patent
Casillas et al.

(10) Patent No.: US 12,754,204 B2
(45) Date of Patent: Oct. 6, 2026

(54) BINAURAL HEARING SYSTEM WITH DISTRIBUTED SENSORS, AND METHOD OF ITS OPERATION

(71) Applicant: SONOVA AG, Staefa (CH)

(72) Inventors: Andrea Hernández Casillas, Zurich (CH); Nina Stumpf, Maennedorf (CH); Niklas Ignasiak, Zürich (CH); Hans-Ueli Roeck, Hombrechtikon (CH); Nicholas Ohs, Zürich (CH)

(73) Assignee: Sonova AG, Staefa (CH)

( * ) Notice: Subject to any disclaimer, the term of this patent is extended or adjusted under 35 U.S.C. 154(b) by 276 days.

(21) Appl. No.: 18/642,443

(22) Filed: Apr. 22, 2024

(65) Prior Publication Data

US 2024/0377430 A1 Nov. 14, 2024

(30) Foreign Application Priority Data

May 11, 2023 (EP) .................................... 23172705

(51) Int. Cl.
*G01P 15/08* (2006.01)
*G01C 19/56* (2012.01)
(Continued)

(52) U.S. Cl.
CPC .............. *G01P 15/08* (2013.01); *G01C 19/56* (2013.01); *G01S 17/08* (2013.01); *G06F 3/0346* (2013.01); *H04R 25/552* (2013.01); *H04R 25/602* (2013.01); *H04R 25/603* (2019.05); *H04R 2225/0216* (2019.05)

(58) Field of Classification Search
CPC ......... G01P 15/08; G01C 19/56; G01S 17/08; G06F 3/0346; H04R 25/552; H04R 25/602; H04R 25/603; H04R 2225/0216; H04R 1/1041
See application file for complete search history.

(56) References Cited

U.S. PATENT DOCUMENTS

2017/0248628 A1* 8/2017 Bhandari ................ G01P 15/08
2019/0227627 A1* 7/2019 Kaifosh .................. G06F 3/015
2022/0329952 A1* 10/2022 Silberzahn ........... H04R 25/505

FOREIGN PATENT DOCUMENTS

EP 2945400 A1 11/2015
EP 3154277 A1 4/2017
(Continued)

OTHER PUBLICATIONS

European Search Report and Written Opinion received Jan. 16, 2024 in European Application No. EP23172705.8.

*Primary Examiner* — Daniel S Larkin
*Assistant Examiner* — Anthony W Megna Fuentes
(74) *Attorney, Agent, or Firm* — ALG Intellectual Property, LLC

(57) ABSTRACT

The disclosure relates to a hearing system comprising a first hearing device including a first sensor configured to provide first sensor data; a second hearing device including a second sensor configured to provide second sensor data indicative of a displacement of the second hearing device and/or a property detected on the user at the location of the second hearing device; and a processing unit communicatively coupled to the first and second sensor. The disclosure further relates to a method of operating the hearing system and a computer-implemented method.

18 Claims, 6 Drawing Sheets

(51) Int. Cl.

| | |
|---|---|
| ***G01S 17/08*** | (2006.01) |
| ***G06F 3/0346*** | (2013.01) |
| ***H04R 1/10*** | (2026.01) |
| ***H04R 25/00*** | (2006.01) |

(56) References Cited

FOREIGN PATENT DOCUMENTS

| | | | |
|---|---|---|---|
| EP | 3264798 | A1 | 1/2018 |
| EP | 4002872 | A1 | 5/2022 |
| EP | 4068799 | A1 | 10/2022 |

* cited by examiner

BINAURAL HEARING SYSTEM WITH DISTRIBUTED SENSORS, AND METHOD OF ITS OPERATION

RELATED APPLICATIONS

The present application claims priority to EP patent application Ser. No. 23/172,705.8, filed May 11, 2023, the contents of which are hereby incorporated by reference in their entirety.

BACKGROUND

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by an input transducer such as a microphone or a microphone array. The reproduced sound may be amplified to account for a hearing loss, such as in a hearing instrument, or may be output without accounting for a hearing loss, for instance to provide for a faithful reproduction of detected ambient sound and/or to add audio features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be be worn at an car include earbuds, earphones, hearables, and hearing instruments such as receiver-in-the-canal (RIC) hearing aids, behind-the-car (BTE) hearing aids, in-the-car (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different cars of the user is sometimes also referred to as a binaural hearing device. A hearing system may also comprise a binaural hearing device and a user device, e.g., a smartphone and/or a smartwatch, communicatively coupled to at least one of the hearing devices.

Hearing devices are often employed in conjunction with communication devices, such as smartphones or tablets, for instance when listening to sound data processed by the communication device and/or during a phone conversation operated by the communication device. More recently, communication devices have been integrated with hearing devices such that the hearing devices at least partially comprise the functionality of those communication devices. A hearing system may comprise, for instance, a hearing device and a communication device.

Various types of sensors can be included in a hearing device. Typically, a hearing instrument includes at least a microphone to detect sound and to output an amplified and/or signal processed version of the sound to the user. Another type of sensor implemented in a hearing device can be a user interface such as a switch or a push button by which the user can adjust a hearing device operation, for instance a sound volume of an audio signal output by the hearing device and/or a parameter of a signal processing performed by a processing unit of the hearing device.

More recently, additional sensor types have been increasingly implemented with hearing devices, in particular sensors which are not directly related to the sound reproduction and/or amplification function of the hearing device. Those sensors include displacement sensors, e.g., an inertial measurement unit (IMUs), accelerometer or gyroscope, for detecting a movement and/or an orientation of the hearing device which may be recorded over time and/or relative to a reference axis such as an axis defined by the gravitational force. Displacement sensors may also be used for detection of a user interacting the hearing device, for instance by tapping on the hearing device which can be measurable as an acceleration of the hearing device caused by the tapping.

Other sensors integrated into hearing devices are employed for detecting a physiological property of the user, e.g., for monitoring a health parameter of the user. Some examples of health monitoring sensors include optical sensors, such as photoplethysmography (PPG) sensors that can be used to detect properties of a blood volume flowing through a probed tissue, and electrophysical sensors, such as electrocardiogram (ECG) sensors recording an electrical activity of the heart, electroencephalography (EEG) sensors detecting electrical activity of the brain, and electrooculography (EOG) sensors to measure an electric potential that exists between the front and back of the human eye. Other hearing device sensors include temperature sensors configured to determine a body temperature of the user and/or a temperature of an ambient environment. Further examples include pressure sensors and/or contact sensors configured to determine a contact of the hearing device with the car. Further examples include humidity sensors configured to determine a humidity level inside and/or outside an car canal.

Usually, the sensors are implemented in both the first and second hearing device in a duplicate manner. E.g., as disclosed in European patent application publication EP 4 068 799 A1, a physiological sensor of a corresponding type such as a PPG senor, EEG sensor, ECG sensor or EOG sensor may be implemented in both hearing devices and controlled to provide the sensor data in a synchronous or asynchronous manner. Similarly, as disclosed in European patent application publication EP 4 002 872 A1, a movement sensor such as an accelerometer may be correspondingly implemented in both hearing devices and controlled to provide the sensor data indicative of a manual gesture performed on one or both hearing devices.

Often, however, the information provided by those duplicate sensors is redundant and does not yield a gain of information as compared to when only one of the hearing devices would be equipped with such a sensor. Yet there is a shortage of space for the number of components that could be included in a hearing device due to size limitations as prescribed by the size of an average car or ear canal. Therefore, it would be desirable to employ the restricted space for additional functionalities, in particular functionalities that would allow to harvest additional information, rather than obtaining the same information in a duplicate manner.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION OF THE DRAWINGS

Figure 1:
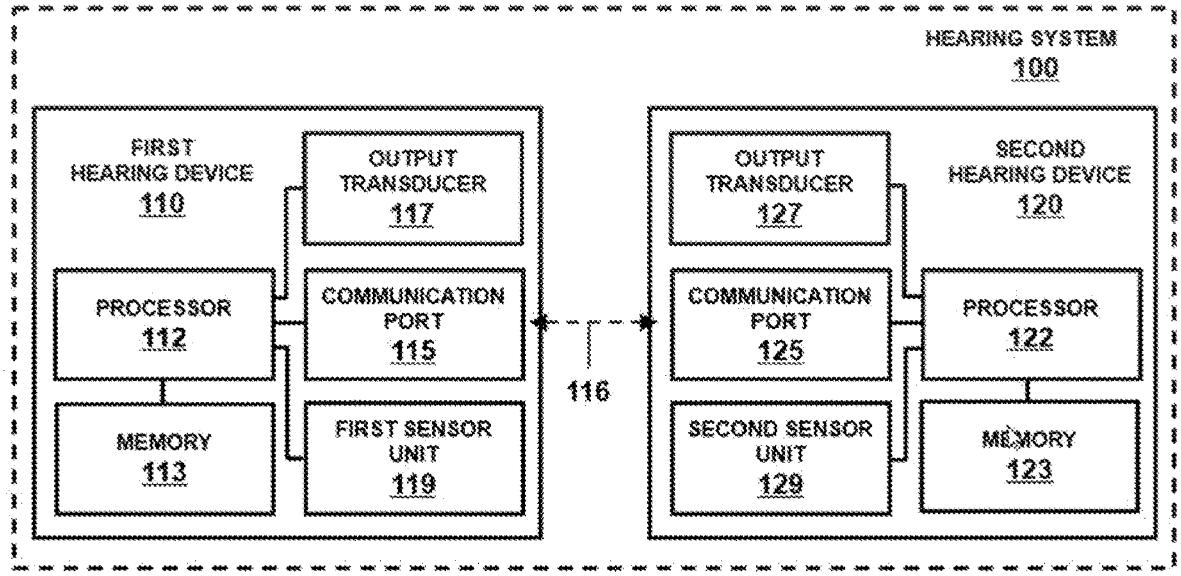
FIG. 1 schematically illustrates an exemplary hearing system.

The disclosure relates to hearing system comprising a first hearing device comprising a first sensor, a second hearing device comprising a second sensor, and a processing unit. The disclosure further relates to a method of operating a hearing system and a computer readable medium.

It is a feature of the present disclosure to avoid at least one of the above mentioned disadvantages and to propose a hearing system in which the available space for components can be exploited in a more effective way, e.g., with regard to a gain in information from the sensor data available from sensors included in the hearing devices. It is another feature to provide for an improved operation of a hearing system in which information included in the sensor data can be obtained with an improved accuracy and/or to on an increased extent or scale. It is yet another feature to account for limited power resources available in a hearing system for supplying the sensors with energy and/or to optimize an energy consumption of the sensors. It is a further feature to provide a method for operating a hearing system in such a manner and/or computer readable medium storing instructions for performing the method. Accordingly, the present disclosure proposes a hearing system comprising

- a first hearing device configured to be worn at a first ear of a user, the first hearing device comprising a first sensor configured to provide first sensor data indicative of a displacement of the first hearing device and/or a property detected on the user at the location of the first hearing device;
- a second hearing device configured to be worn at a second car of the user, the second hearing device comprising a second sensor configured to provide second sensor data indicative of a displacement of the second hearing device and/or a property detected on the user at the location of the second hearing device; and
- a processing unit communicatively coupled to the first and second sensor, wherein the first sensor is configured to provide an information content in the first sensor data differing from an information content in the second sensor data, and the processing unit is configured to
  - combine the information content in the first sensor data with the information content in the second sensor data; and to
  - determine, from the combined information, information about a displacement of the user and/or the property detected on the user with an improved accuracy and/or with an increased information content as compared to the information contained in the first and second sensor data.

Thus, by combining the different information contained in the first and second sensor data, the obtained information may be enhanced with regard to its accuracy and/or information content. E.g., an enhanced accuracy may be achieved by evaluating the first and second sensor data and verifying that the evaluated sensor data yields a corresponding information content. An enhanced accuracy may also be achieved by combining information of a broader measurement range in the first sensor data with information of a more restricted measurement range in the second sensor data. An enhanced information content may be achieved by evaluating the first and second sensor data and combining the results of the evaluation. An enhanced information content may also be achieved by combining information of a first measurement range in the first sensor data with information of a second measurement range in the second sensor data.

Independently, the present disclosure also proposes a method of operating a hearing system comprising method of operating a hearing system, the hearing system comprising

- combining information contained in the first sensor data with information contained in the second sensor data; and
- determining, from the combined information, information about a displacement of the user and/or the property detected on the user with an improved accuracy and/or with an increased information content as compared to the information contained in the first and second sensor data.

Independently, the present disclosure also proposes a non-transitory computer-readable medium storing instructions that, when executed by a processing unit included in a hearing system, cause the processing unit to perform the method.

Subsequently, additional features of some implementations of the method of operating a hearing device and/or the hearing device are described. Each of those features can be provided solely or in combination with at least another feature. The features can be correspondingly provided in some implementations of the hearing system and/or the method and/or the computer implemented medium.

In some implementations, the processing unit is further configured to determine a degree of correlation between the information contained in the first sensor data and the information contained in the second sensor data, wherein the information is combined depending on the degree of correlation. In some implementations, the information contained in the first sensor data and the information contained in second sensor data can be synchronized in the combined information, for instance after a degree of correlation between the information contained in the first sensor data and the information contained in second sensor data is determined to be above the threshold. E.g., the information contained in the first sensor data and the information contained in the second sensor data may only be included in the combined information when the degree of correlation is determined to be above the threshold. In this way it may be ensured that the information included in the combined information corresponds to the information contained in the first sensor data and the second sensor data which has been found to be related to each other, e.g., temporally related, by the degree of correlation.

In some implementations, the first sensor includes a first sensor element sensitive to the displacement of the first hearing device and/or the property detected on the user at the location of the first hearing device which is different from a second sensor element included in the second sensor sensitive to the displacement of the second hearing device and/or the property detected on the user at the location of the second hearing device. In some implementations, the first hearing device differs from the second hearing device in that the first sensor element is only included in the first hearing device. In particular, the first sensor element may thus be omitted in the second hearing device. In some implementations, the first hearing device differs from the second hearing device in that the second sensor element is only included in the second hearing device. In particular, the second sensor element may thus be omitted in the first hearing device.

In some implementations, the first sensor is an accelerometer configured to provide the first sensor data as accelerometer data indicative of an acceleration of a mass included in the accelerometer; and the second sensor is a gyroscope configured to provide the second sensor data as gyroscope data indicative of a change of orientation of a mass included in the gyroscope.

In some implementations, the first sensor is a first optical sensor configured to provide the first sensor data as first optical sensor data, the optical sensor comprising a first light source configured to emit light toward the first car, and a first light detector configured to detect a reflected and/or scattered part of the light, the first optical sensor data indicative of the light detected by the first light detector; and the second sensor is a second optical sensor configured to provide said second sensor data as second optical sensor data, the second optical sensor comprising a second light source configured to emit light toward the second car and a second light detector configured to detect a reflected and/or scattered part of the light, the second optical sensor data indicative of the light detected by the second light detector, wherein the first light source is configured to emit the light at a first wavelength and the second light source is configured to emit the light at a second wavelength different from the first wavelength and/or the first light detector is configured to detect the reflected and/or scattered part of the light at the first wavelength and the second light detector is configured to detect the reflected and/or scattered part of the light at the second wavelength different from the first wavelength.

In some implementations, the first sensor is configured to provide said first sensor data at a first sampling rate; and the second sensor is configured to provide said second sensor data at a second sampling rate different from the first sampling rate. In some instances, the first sensor is a first accelerometer configured to provide the first sensor data as first accelerometer data indicative of an acceleration of a mass included in the first accelerometer at a first sampling rate; and the second sensor is a second accelerometer configured to provide the second sensor data as second accelerometer data indicative of an acceleration of a mass included in the second accelerometer at a second sampling rate different from the first sampling rate.

In some implementations, the first sensor is a first accelerometer configured to provide the first sensor data as first accelerometer data indicative of an acceleration of a mass included in the first accelerometer at a first measurement range including a value of at least 1 g; and the second sensor is a second accelerometer configured to provide the second sensor data as second accelerometer data indicative of an acceleration of a mass included in the second accelerometer at a second measurement range including a value of at most 250 g different from the first measurement range. E.g., the first measurement range may only include values smaller than 250 g, for instance smaller than 10 g, wherein the second measurement range may include the value of 250 g, for instance 10 g. As another example, the second measurement range may only include values larger than 1 g, for instance larger than 2 g, wherein the first measurement range may include the value of 1 g, for instance 2 g.

In some implementations, the first sensor is an optical sensor configured to provide the first sensor data as optical sensor data, the optical sensor comprising a light source configured to emit light toward the first ear, and a light detector configured to detect a reflected and/or scattered part of the light, the optical sensor data indicative of the light detected by the first light detector; and the second sensor is a bioelectric sensor configured to provide the second sensor data as bioelectric sensor data, the bioelectric including an electrode to detect a bioelectric signal in the form of an electrical current or potential generated by a living organism, the bioelectric sensor data indicative of the bioelectric signal.

In some implementations, the processing unit is configured to control the first sensor and/or the second sensor to provide the first sensor data and/or the second sensor data. In some implementations, the first hearing device comprises a first battery and the second hearing device comprises a second battery, wherein the processing unit is configured to control the first sensor and/or the second sensor depending on a battery status of the first battery and/or the second battery.

In some implementations, the first sensor is configured to spend less energy during providing the first sensor data than the second sensor during providing the second sensor data, wherein the processing unit is configured to control the second sensor to provide the second sensor data less often than the first sensor to provide the first sensor data.

In some implementations, the processing unit is further configured to determine a quality factor of the information contained in the first sensor data and a quality factor of the information contained in the second sensor data, wherein one of the information contained in the first sensor data and the information contained in the second sensor data is discarded and/or weighted to a different degree than the other of the information contained in the first sensor data and the information contained in the second sensor data depending on the quality factor of the information contained in the first sensor data and/or the quality factor of the information contained in the second sensor data. In some implementations, the processing unit is configured to determine a quality factor of the information contained in the first sensor data, wherein the second sensor is controlled to be turned on depending on the quality factor of the information contained in the first sensor data, e.g., depending on whether the quality factor of the information contained in the first sensor data is below a threshold.

In some implementations, the processing unit is configured to control the first sensor and the second sensor to provide the first sensor data and the second sensor data within a predetermined time window. In some instances, the time window is equal or less than 20% than a time corresponding to a sampling rate of the first sensor and/or equal or less than 20% than a time corresponding to a sampling rate of the second sensor. In some instances, the time window is equal or less than 10% than a time corresponding to a sampling rate of the first sensor and/or equal or less than 10% than a time corresponding to a sampling rate of the second sensor. In some instances, the time window is equal or less than 10 milliseconds, e.g., equal or less than 1 millisecond.

In some implementations, combining the information contained in the first sensor data and the information contained in the second sensor data comprises including both the information contained in the first sensor data and the information contained in the second sensor data in the combined information and/or including an average value of the information contained in the first sensor data and the information contained in the second sensor data in the combined information and/or selecting one of the information contained in the first sensor data and the information contained in the second sensor data to be included in the combined information and/or scaling one or both of the information contained in the first sensor data and the information contained in the second sensor data relative to information contained in the other of the first sensor data and the second sensor data to be included in the combined information and/or performing any other mathematical operation with the information contained in the first sensor data and the information contained in the second sensor data to be included in the combined information.

In some implementations, combining the information contained in the first sensor data and the information contained in the second sensor data comprises combining the raw signals output by the first sensor and the second sensor. In some examples, the raw signals may be combined on a time series cluster. In some implementations, combining the information contained in the first sensor data and the information contained in the second sensor data comprises extracting one or more features from the first sensor data and/or the second sensor data, wherein the extracted features are included in the combined information. In some implementations, combining the information contained in the first sensor data and the information contained in the second sensor data comprises evaluating the first sensor data and/or the second sensor data to derive information from the first sensor data and/or the second sensor data, wherein the derived information is included in the combined information.

In some implementations, the processing unit comprises a processor included in the first hearing device and/or a processor included in the second hearing device. The processor included in the first hearing device and the processor included in the second hearing device may be communicatively coupled via a communication link, e.g., a wireless communication link. To this end, a first communication port may be included in the first hearing device and/or a second communication port may be included in the second hearing device.

FIG. 1 illustrates an exemplary hearing system 100 comprising a first hearing device 110 configured to be worn at a first car of a user, and a second hearing device 120 configured to be worn at a second car of the user. Hearing devices 110, 120 may each be implemented by any type of hearing device configured to enable or enhance hearing by a user wearing hearing device 110, 120. For example, hearing device 110, 120 may be implemented by a hearing aid configured to provide an audio content such as an amplified version of a detected ambient sound to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis. As another example, hearing device 110, 120 may be implemented by an earbud or an earphone or a hearable configured to reproduce an audio content communicated by a wire or wirelessly to hearing device 110, 120 and/or to reproduce a detected ambient sound with or without altering the ambient sound and/or adding sound features to the ambient sound.

In the illustrated example, first hearing device 110 includes a processor 112 communicatively coupled to a memory 113, an output transducer 117, a communication port 115, and a first sensor unit 119. Further in this example, second hearing device 120 has a corresponding configuration including another processor 122 communicatively coupled to another memory 123, another output transducer 127, another communication port 125, and another sensor unit 129. A processing unit includes processor 112 of first hearing device 110 and processor 122 of second hearing device 120. Other configurations are conceivable in which, for instance, processor 112, 122 is only provided in one of hearing devices 110, 120 such that the processing unit includes only one of the processors. Hearing devices 110, 120 may include additional or alternative components as may serve a particular implementation.

Output transducer 117, 127 may be implemented by any suitable audio transducer configured to output an audio signal to the user, for instance a receiver of a hearing aid, an output electrode of a cochlear implant system, or a loudspeaker of an earbud. The audio transducer may be implemented as an acoustic transducer configured to generate sound waves when outputting the audio signal. Output transducer 117 of first hearing device 110 is subsequently referred to as a first output transducer. Output transducer 127 of second hearing device 120 is subsequently referred to as a second output transducer.

First hearing device 110 and/or second hearing device 120 may further include an input transducer. The input transducer may be implemented by any suitable device configured to detect sound in the environment of the user and to provide an input audio signal indicative of the detected sound, e.g., a microphone or a microphone array. First hearing device 110 and/or second hearing device 120 may further include an audio signal receiver. The audio signal receiver may be implemented by any suitable data receiver and/or data transducer configured to receive an input audio signal from a remote audio source. For instance, the remote audio source may be a wireless microphone, such as a table microphone, a clip-on microphone and/or the like, and/or a portable device, such as a smartphone, smartwatch, tablet and/or the like, and/or any another data transceiver configured to transmit the input audio signal to the audio signal receiver. E.g., the remote audio source may be a streaming source configured for streaming the input audio signal to the audio signal receiver. The audio signal receiver may be configured for wired and/or wireless data reception of the input audio signal. For instance, the input audio signal may be received in accordance with a Bluetooth™ protocol and/or by any other type of radio frequency (RF) communication.

First sensor unit 119 may be implemented by any suitable sensor configured to provide first sensor data indicative of a displacement of first hearing device 110 and/or a property detected on the user at the location of first hearing device 110. Second sensor unit 129 may be implemented by any suitable sensor configured to provide second sensor data indicative of a displacement of second hearing device 120 and/or a property detected on the user at the location of second hearing device 120.

Communication port 115, 125 may be implemented by any suitable data transmitter and/or data receiver and/or data transducer configured to exchange data between first hearing device 110 and second hearing device 120 via a communication link 116. Communication port 115, 125 may be configured for wired and/or wireless data communication. In particular, data may be exchanged wirelessly via communication link 116 by radio frequency (RF) communication. For instance, data may be communicated in accordance with a Bluetooth™ protocol and/or by any other type of RF communication such as, for example, data communication via an internet connection and/or a mobile phone connection. Examples may include data transmission within a frequency band including 2.4 GHz and/or 5 GHz and/or via a 5G broadband cellular network and/or within a high band spectrum (HiBan) which may include frequencies above 20 GHz. Data may also be exchanged wirelessly via communication link 116 through the user's skin, in particular by employing skin conductance between the positions at which hearing devices 110, 120 are worn.

The communicated data may comprise the first sensor data provided by first sensor unit 119 and/or the second sensor data provided by second sensor unit 129. The communicated data may also comprise data processed by processing unit 112, 122, in particular sensor data processed by processing unit 112, 122, and/or data maintained in memory 113, 123, in particular sensor data maintained in memory 113, 123. Communication port 115 of first hearing device 110 is subsequently referred to as a first communication port. Communication port 125 of second hearing device 120 is subsequently referred to as a second communication port.

Memory 113, 123 may be implemented by any suitable type of storage medium and is configured to maintain, e.g. store, data controlled by processing unit 112, 122, in particular data generated, accessed, modified and/or otherwise used by processing unit 112, 122. For example, memory 113 may be configured to store instructions used by processing unit 112 to process the first sensor data provided by first sensor unit 119 and/or the second sensor data provided by second sensor unit 129, e.g., processing instructions as further described below. Memory 113, 123 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 113, 123. Memory 113, 123 may further comprise a volatile memory, for instance a static or dynamic random access memory (RAM). A memory unit includes memory 113 of first hearing device 110 and memory 123 of second hearing device 120. Other configurations are conceivable in which memory 113, 123 is only provided in one of hearing devices 110, 120 such that the memory unit includes only one of the memories. Memory 113 of first hearing device 110 is subsequently referred to as a first memory. Memory 123 of second hearing device 120 is subsequently referred to as a second memory.

Processing unit 112, 122 is configured to access the first sensor data provided by first sensor unit 119, and the second sensor data provided by second sensor unit 129. Processing unit 112, 122 is further configured to combine information contained in the first sensor data with information contained in the second sensor data. Processing unit 112, 122 is further configured to determine, from the combined information, information about a displacement of the user and/or the property detected on the user with an improved accuracy and/or with an increased information content as compared to the information contained in the first and second sensor data. These and other operations, which may be performed by processing unit 112, 122, are described in more detail in the description that follows.

In the illustrated example, processing unit 112, 122 comprises processor 112 of first hearing device 110 subsequently referred to as a first processor, and processor 122 of second hearing device 120 subsequently referred to as a second processor. E.g., processors 112, 122 may exchange data via communication link 116. In some implementations, each of the above described operations can be performed independently by at least one of processor 112 and processor 122 of the processing unit. In some implementations, those operations can be shared between processors 112 and processor 122. For instance, at least one of the operations may be performed by one of processors 112, 122, and the remaining operations may be performed by the other of processors 112, 122. In some implementations, at least one those operations can be performed jointly by processor 112 and processor 122, for instance by performing different tasks of the operation. Processing unit 112, 122 may be implemented, for instance, as a distributed processing system of processors 112, 122 and/or in a master/slave configuration of processors 112, 122. In some other implementations, the processing unit configured to perform those operations consists of processor 112 included in first hearing device 110 or processor 122 included in second hearing device 120.

Figure 2:
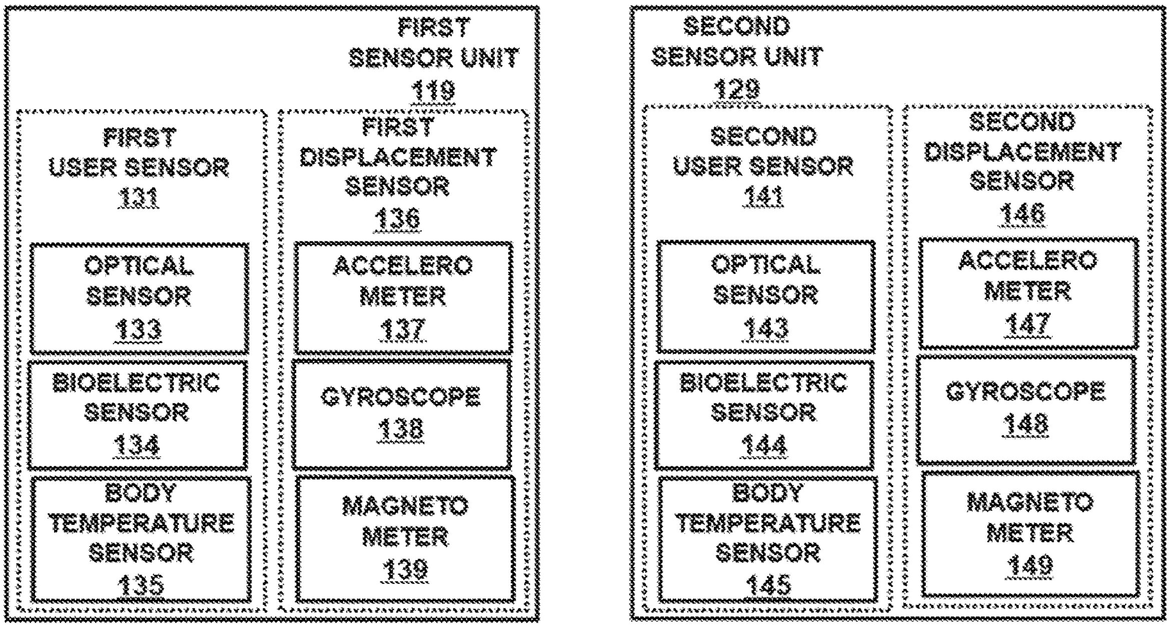
FIG. 2 schematically illustrates exemplary sensor units comprising one or more sensors which may be implemented in the hearing system illustrated in FIG. 1.

As illustrated in FIG. 2, first sensor unit 119 may include at least one user sensor 131 configured to provide user data indicative of a property detected on the user at the location of first hearing device 110, e.g., an optical sensor 133 and/or a bioelectric sensor 134 and/or a body temperature sensor 135. In some implementations, user sensor 131 is implemented as a physiological sensor configured to provide physiological data indicative of a physiological property of the user. Optical sensor 133 may be configured to emit the light at a wavelength absorbable by an analyte contained in blood such that the physiological sensor data comprises information about the blood flowing through tissue at the car. E.g., optical sensor 133 can be configured as a photoplethysmography (PPG) sensor such that the physiological sensor data comprises PPG data, e.g. a PPG waveform. Bioelectric sensor 134 may be implemented as a skin impedance sensor and/or an electrocardiogram (ECG) sensor and/or an electroencephalogram (EEG) sensor and/or an electrooculography (EOG) sensor. Body temperature sensor 135 may be implemented as any sensor configured to detect thermal energy on the user's body, e.g., a thermopile.

Second sensor unit 129 may also include at least one user sensor 141 configured to provide user data indicative of a property detected on the user at the location of second hearing device 120, e.g., an optical sensor 133 and/or a bioelectric sensor 134 and/or a body temperature sensor 135. In some implementations, user sensor 131 is also implemented as a physiological sensor configured to provide physiological data indicative of a physiological property of the user. User sensor 131 of first sensor unit 119 is subsequently referred to as a first user sensor which may comprise, e.g., first optical sensor 133 and/or first bioelectric sensor 134 and/or first body temperature sensor 135 and/or which may be implemented as a first physiological sensor. User sensor 141 of second sensor unit 129 is subsequently referred to as a second user sensor which may comprise, e.g., second optical sensor 143 and/or second bioelectric sensor 144 and/or second body temperature sensor 145 and/or which may be implemented as a second physiological sensor.

First sensor unit 119 may include a displacement sensor 136 configured to provide displacement data indicative of a displacement of first hearing device 110. E.g., displacement sensor 136 may be implemented by any suitable sensor configured to provide displacement data indicative of a rotational displacement and/or a translational displacement of first hearing device 110. In particular, displacement sensor 136 may comprise at least one inertial sensor 137, 138. The inertial sensor may include, for instance, an accelerometer 137 configured to provide the displacement data representative of an acceleration and/or a translational movement and/or a rotation, and/or a gyroscope 138 configured to provide the displacement data representative of a rotation. Displacement sensor 136 may also comprise an electronic compass such as a magnetometer 139 configured to provide the displacement data representative of a change of a magnet field, in particular a magnetic field in an ambient environment of hearing device 110 such as the Earth's magnetic field. Displacement sensor 136 may also comprise an optical detector such as a light sensor and/or a camera. The displacement data may be provided by generating optical detection data over time and evaluating variations of the optical detection data. Displacement sensor 136 may also be implemented by any combination of the sensors mentioned above. E.g., accelerometer 137 may be combined with gyroscope 138 and/or magnetometer 139. In some examples, displacement sensor 136 may include an inertial measurement unit (IMU), which may comprise accelerometer 137 and gyroscope 138.

Second sensor unit 129 may also include a displacement sensor 146 configured to provide displacement data indicative of a displacement of second hearing device 120, e.g., indicative of a rotational displacement and/or a translational displacement of second hearing device 120. For instance, second sensor unit 129 may include at least one inertial sensor, e.g., an accelerometer 147 and/or a gyroscope 148 and/or an IMU, and/or at least one magnetometer 139 and/or at least one optical detector. Displacement sensor 136 of first sensor unit 119 is subsequently referred to as a first displacement sensor. Displacement sensor 146 of second sensor unit 129 is subsequently referred to as a second displacement sensor.

First sensor unit 119 is configured to provide the first sensor data, e.g., first user data and/or first physiological data and/or first displacement data. Second sensor unit 129 is configured to provide the second sensor data, e.g., second user data and/or second physiological data and/or second displacement data. The first sensor data comprises an information content differing from information contained in the second sensor data. To this end, at least one sensor 131, 133-135, 136, 137-139 may be included in first sensor unit 119 which is different from and/or has a configuration different from sensors 141, 143-145, 146, 147-149 included in second sensor unit 129. In some implementations, a degree of correlation between the information contained in the first sensor data and the information contained in the second sensor data may be determined, wherein the information is combined depending on the degree of correlation.

In some implementations, first sensor unit 119 comprises one or more first sensors 131, 133-135, 136, 137-139 including a first sensor element sensitive to the displacement of first hearing device 110 and/or the property detected on the user at the location of first hearing device 110, which is different from a second sensor element included in one or more second sensors 141, 143-145, 146, 147-149 comprised in second sensor unit 129 sensitive to the displacement of second hearing device 120 and/or the property detected on the user at the location of second hearing device 120. In particular, the first sensor element may only be included in first hearing device 110 and/or the second sensor element may be only included in second hearing device 120.

As an example, the first sensor may be accelerometer 137 configured to provide the first sensor data as accelerometer data indicative of an acceleration of a mass included in the accelerometer. The first sensor element may thus be implemented as the mass indicative of the acceleration. The second sensor may be gyroscope 148 configured to provide the second sensor data as gyroscope data indicative of a change of orientation of a mass included in the gyroscope. The second sensor element may thus be implemented as the mass indicative of the change of orientation. Combining the information contained in the accelerometer data with the information contained in the gyroscope data can be exploited to determine information about a displacement of the user with an increased accuracy and/or content. E.g., the information may be combined to provide IMU data corresponding to the data output by an inertial measurement unit (IMU) comprising accelerometer 137 and gyroscope 148.

As another example, the first sensor may be first optical sensor 133 configured to provide the first sensor data as first optical sensor data, the first optical sensor comprising a first light source configured to emit light toward the first car, and a first light detector configured to detect a reflected and/or scattered part of the light, wherein the first optical sensor data is indicative of the light detected by the first light detector. The first light source may be configured to emit the light at a first wavelength and/or the first light detector may be configured to detect the reflected and/or scattered part of the light at the first wavelength. The first sensor element may thus be implemented as the first light source and/or the first light detector. The second sensor may be second optical sensor 143 configured to provide the second sensor data as second optical sensor data, the second optical sensor comprising a second light source configured to emit light toward the second car, and a second light detector configured to detect a reflected and/or scattered part of the light, wherein the second optical sensor data is indicative of the light detected by the second light detector. The second light source may be configured to emit the light at a second wavelength different from the first wavelength and/or the second light detector may be configured to detect the reflected and/or scattered part of the light at the second wavelength. The second sensor element may thus be implemented as the second light source and/or the second light detector. Combining the information contained in the first optical sensor data with the information contained in the second optical sensor data can thus be exploited to determine information about a property detected on the user, e.g., a physiological property, with an increased accuracy and/or content.

As another example, the first sensor may be first accelerometer 137 configured to provide the first sensor data as first accelerometer data at a first sampling rate. The second sensor may be second accelerometer 147 configured to provide the second sensor data as second accelerometer data at a second sampling rate different from the first sampling rate. The first accelerometer 137 and second accelerometer 147 have a different configuration by providing the first accelerometer data and the second accelerometer data at a different sampling rate. E.g., an energy consumption of the accelerometer 137, 147 providing the accelerometer data at a lower sampling rate can be reduced as compared to an energy consumption of the accelerometer 137, 147 providing the accelerometer data at a higher sampling rate. Combining the information contained in the first accelerometer data with information contained in the second accelerometer data can thus be exploited to determine information about a displacement of the user with an increased accuracy and/or content. E.g., an aliasing of information contained in one of the first and second accelerometer data may be avoided by the combining with the information contained the other of the first and second accelerometer data. On the other hand, the information below the Nyquist frequency provided in the accelerometer data at the lower sampling rate may be obtained with a higher accuracy as compared to the accelerometer data provided at the higher sampling rate in order to improve the accuracy about the information about the displacement of the user when combining the information in the first and second accelerometer data.

As another example, the first sensor may be first accelerometer 137 configured to provide said first sensor data as first accelerometer data at a first measurement range comprising a value of at least 1 g. The second sensor may be second accelerometer 147 configured to provide said second sensor data at a second measurement range different from the first measurement range comprising a value of at most 250 g. The first accelerometer 137 and second accelerometer 147 thus have a different configuration by providing the first accelerometer data and the second accelerometer data at a different measurement range. E.g., the second measurement range may be above 1 g, in particular above 2 g, and/or the first measurement range may be below 250 g, in particular below 10 g. Combining the information contained in the first accelerometer data with information contained in the second accelerometer data can thus be exploited to determine information about a displacement of the user with an increased accuracy and/or content.

As another example, the first sensor may be accelerometer 137 configured to provide the first sensor data as accelerometer data. The second sensor may be an inertial measurement unit (IMU), which may comprise accelerometer 147 and gyroscope 148, configured to provide the second sensor data as IMU data indicative of an acceleration and a change of orientation, e.g., an angular rate, of a mass included in the IMU. The second sensor element may thus be implemented as the mass included in the IMU. In some examples, combining the information contained in the accelerometer data with the information contained in the IMU data can be exploited to calibrate the IMU data with the accelerometer data, or vice versa. In some examples, the accelerometer data may be provided at a first sampling rate, and the IMU data may be provided at a second sampling rate different from the first sampling rate. Combining the information contained in the accelerometer data with the information contained in the IMU data can thus be exploited to determine information about a displacement of the user with an increased accuracy and/or content. E.g., the first sampling rate of the accelerometer data may be higher in order to pick up vibrations from the user's skull indicative of an own voice activity, and the second sampling rate of the IMU may be lower to pick up movements of the user's head and/or body. The information content of first and second sensor data can thus be increased to indicate both an own voice activity and a head and/or body movement of the user. In some examples, the IMU may be controlled to provide the IMU data depending on the accelerometer data, e.g., the IMU may be activated to provide the IMU data based on conditions derived from the accelerometer data. To illustrate, the IMU may be activated to provide the IMU data once the accelerometer data is indicative of a head motion, e.g., to allow tracking of the head motion with higher accuracy. Combining the information contained in the accelerometer data with the information contained in the IMU data can thus be exploited to determine information with an increased accuracy and/or information content depending on the conditions derived from the accelerometer data. In this way, by only activating the IMU depending on such a condition, a power consumption of the IMU can be reduced. In some implementations, the combined information may be employed for steering of a beamformer, e.g., based on detected head motions, and/or for detecting of a user input, e.g., of the user's own voice and/or of head movement gestures such as a head shaking. The user input may be employed, e.g., for a steering of the hearing device.

As another example, the first sensor may be a first IMU, which may comprise accelerometer 137 and gyroscope 138, configured to provide the first sensor data as first IMU data. The second sensor may be a second IMU, which may comprise accelerometer 147 and gyroscope 148, configured to provide the second sensor data as second IMU data. In some examples, the first IMU data may be provided at a first sampling rate, and the second IMU data may be provided at a second sampling rate different from the first sampling rate. Combining the information contained in the first IMU data with the information contained in the second IMU data can thus be exploited to determine the IMU information with an increased accuracy and/or content.

As another example, the first sensor may be accelerometer 137 configured to provide the first sensor data as accelerometer data. The second sensor may be magnetometer 149 configured to provide the second sensor data as magnetometer data indicative of a change of a magnet field, e.g., the Earth's magnetic field relative to magnetometer 149. Combining the information contained in the accelerometer data with the information contained in the magnetometer data can be exploited to determine information about a displacement of the user with an increased accuracy and/or content. E.g., combining the information contained in the accelerometer data with the information contained in the magnetometer data can be exploited to calibrate the accelerometer data with the magnetometer data, or vice versa.

As another example, the first sensor may be accelerometer 137 configured to provide the first sensor data as accelerometer data, or an IMU configured to provide the first sensor data as IMU data. The second sensor may include user sensor 141 implemented as a barometer configured to provide the second sensor data as barometer data indicative of an air pressure in the user's environment and/or the second sensor may include body temperature sensor 146 configured to provide the second sensor data as temperature data indicative of core body temperature of the user. Combining the information contained in the accelerometer data or in the IMU data with the information contained in the barometer data and/or in the temperature data can be exploited to determine information about a displacement of the user with an increased accuracy and/or content. To illustrate, the barometer data may indicate a change of altitude of the user and/or the temperature data may indicate a change of the user's body temperature. In combination with the accelerometer data or the IMU data, the barometer data and/or the temperature data can thus be meaningful to identify a physical activity of the user such as hiking, cycling, or climbing. E.g., a movement pattern derived from the accelerometer data or the IMU data may be determined, e.g., classified, as being representative for the physical activity. When combining the movement pattern determined from the accelerometer data or the IMU data with the barometer data and/or the temperature data, an accuracy of such a detection of the physical activity can be increased, e.g., by verifying whether an altitude difference completed by the user or a body temperature difference is representative or typical for a respective physical activity, and/or an information content about the physical activity can be enhanced, e.g., by an altitude difference completed during the physical activity and/or a body temperature increase related to the physical activity. In some examples, the barometer and/or temperature sensor 145 may be controlled to provide the barometer data and/or the temperature data depending on the accelerometer data or IMU data, e.g., the barometer and/or temperature sensor 145 may be activated to provide the barometer data and/or temperature data based on conditions derived from the accelerometer data or the IMU data such as a movement pattern corresponding to a certain physical activity.

As another example, the first sensor may be accelerometer 137 configured to provide the first sensor data as accelerometer data, or an IMU configured to provide the first sensor data as IMU data, or magnetometer 139 configured to provide the first sensor data as magnetometer data. The second sensor may include user sensor 141 implemented as a distance sensor, e.g., an ultrasonic and/or infrared distance (IR) sensor, configured to provide the second sensor data as distance data indicative of a distance or a change of distance of the user from an object in the user's environment. For example, the object may be an obstacle for the user, or the object may be a user device connectable to the hearing device, e.g., a multimedia device or a streaming device. The information contained in the accelerometer data or in the IMU data or in the magnetometer data can be indicative of an orientation of the user, which, when combined with the distance data, can indicate the location of the user or change of location relative to the object. The combined information may be employed, for instance, for indoor navigation use cases, e.g., to assist the user to find an object or to get around an obstacle. The combined information may also be employed for a location-based system of the hearing device, e.g., to provide for different audio processing programs at different locations. To illustrate, different audio processing programs may be selected when the user is in his kitchen and in his living room.

As another example, the first sensor may be optical sensor 133 configured as a photoplethysmography (PPG) sensor configured to provide the first sensor data as PPG data indicative of properties of a blood volume flowing through a probed tissue. The second sensor may be body temperature sensor 146 configured to provide the second sensor data as temperature data indicative of core body temperature of the user. Combining the information contained in the PPG data with the information contained in the temperature data can be exploited to determine information about a physiological property of the user, e.g., an infectious disease, with an increased accuracy and/or information content. To illustrate, an increased variability of the user's heart rate, as indicated by the information in the PPG data, combined with an increased body temperature, as indicated by the information in the temperature data, can indicate such an infection of the user.

As another example, the first sensor may be optical sensor 133 configured as a PPG sensor configured to provide the first sensor data as PPG data. The second sensor may be user sensor 141 implemented as a microphone configured to provide the second sensor data as audio data indicative of an own voice activity of the user and/or sound detected in the ambient environment of the user. In some examples, the own voice activity of the user may comprise any features of a speech of the user, e.g., a communication pattern, a word production speed, conversation terms, which features may be extracted from the audio signal. The PPG data can be indicative of a stress level of the user. To illustrate, an increase of the heart rate and/or blood pressure may indicate an increased stress level. Combining the information contained in the PPG data with the information contained in the audio data can be exploited to determine information about a physiological property of the user, e.g., a cognitive load. For instance, an increased stress level in combination with an increased noise level of the ambient sound and/or a characteristic feature of the user's own voice can indicate an increased cognitive load.

As another example, the first sensor may be optical sensor 133 configured as a PPG sensor configured to provide the first sensor data as PPG data. The second sensor may be bioelectric sensor 144 implemented as an electrocardiogram (ECG) sensor configured to provide the second sensor data as ECG data indicative of an electrical activity of the heart. Combining the information contained in the PPG data with the information contained in the ECG data can be exploited to determine information about a physiological property of the user, e.g., a heart rate, a blood pressure, a resting heart rate, a maximum oxygen consumption (VO2max), with an increased accuracy and/or information content. E.g., a blood pressure may be determined based on blood flow information contained in the PPG data and electrical heart signal information contained in the ECG data. For instance, when combining the information contained in the PPG data and the information contained in the ECG data, the raw signal output of the PPG sensor and the ECG sensor may be combined on a time series cluster.

Those and other exemplary different configurations of the first and second sensor, 131, 133-135, 136, 137-139, 141, 143-145, 146, 147-149, as described above, are described in more detail in the description that follows.

Figure 3:
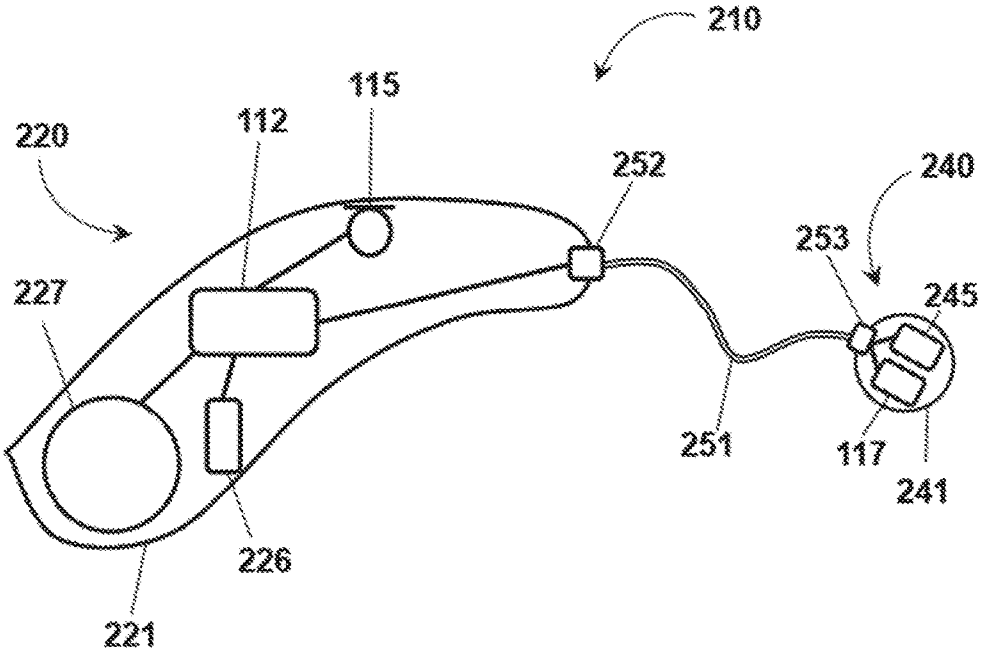
FIG. 3 schematically illustrates an embodiment of a hearing device comprised in the hearing system illustrated in FIG. 1 as a RIC hearing aid.

FIG. 3 illustrates an exemplary implementation of first hearing device 110 as a RIC hearing aid 210. RIC hearing aid 210 comprises a BTE part 220 configured to be worn at an car at a wearing position behind the car, and an ITE part 240 configured to be worn at the car at a wearing position at least partially inside an car canal of the car. BTE part 220 comprises a BTE housing 221 configured to be worn behind the car. BTE housing 221 accommodates processor 112 communicatively coupled to an input transducer 115, e.g., a microphone or a microphone array. BTE housing 221 further accommodates a first sensor 226, which may be implemented by any of sensors 131, 133-135, 136, 137-139 described above, and is also communicatively coupled to processor 112. BTE part 220 further includes a battery 227 as a power source. ITE part 240 is an earpiece comprising an ITE housing 241 at least partially insertable in the car canal. ITE housing 241 accommodates output transducer 117. ITE part 240 may further include an additional first sensor 245, which may be implemented by any other of first sensors 131, 133-135, 136, 137-139 described above. BTE part 220 and ITE part 240 are interconnected by a cable 251. Processor 112 is communicatively coupled to output transducer 117 and to additional first sensor 245 of ITE part 240 via cable 251 and cable connectors 252, 253 provided at BTE housing 221 and ITE housing 241. Second hearing device 120 may be correspondingly implemented as a RIC hearing aid 210, wherein BTE housing 221 accommodates a second sensor 226, which may be implemented by any of sensors 141, 143-145, 146, 147-149 described above, and/or ITE housing 241 accommodates an additional second sensor 245, which may be implemented by any other of sensors 141, 143-145, 146, 147-149 described above.

Figure 4:
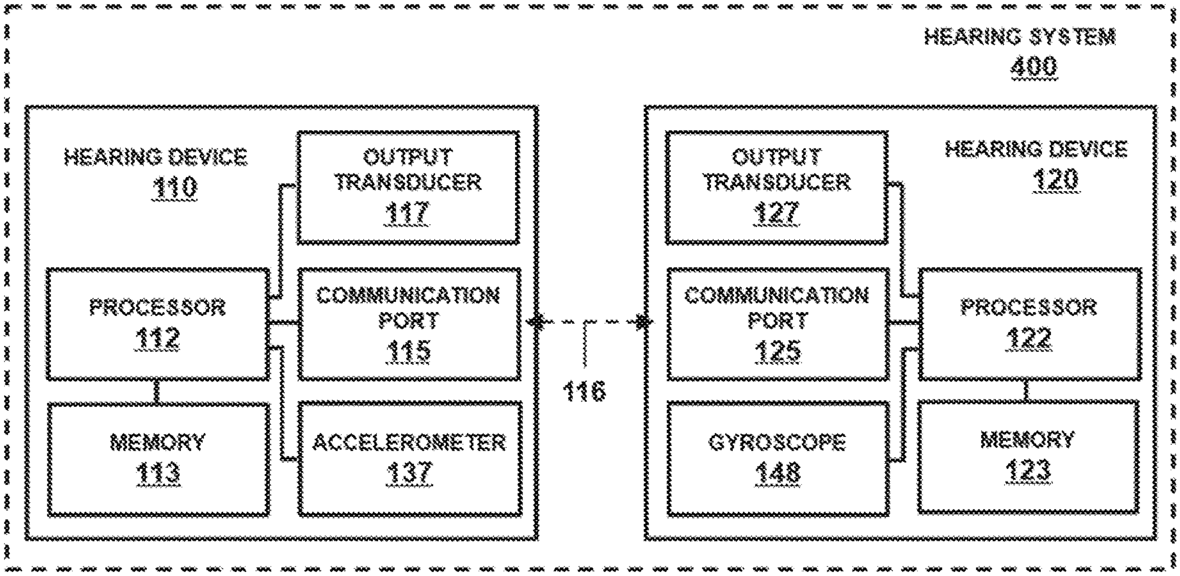
FIGS. 4-7 schematically illustrate exemplary hearing systems by which the hearing system illustrated in FIG. 1 can be implemented.

FIG. 4 illustrates an exemplary hearing system 400 by which hearing system 100 illustrated in FIG. 1 may be implemented. In the illustrated example, first sensor unit 119 of first hearing device 110 is implemented as accelerometer 137. Second sensor unit 119 of second hearing device 120 is implemented as gyroscope 148. The accelerometer data provided by accelerometer 137 and the gyroscope data provided by gyroscope 148 can be received by processing unit 112, 113 via communication ports 115, 125. Processing unit 112, 113 can then combine information contained in the accelerometer data with information contained in the gyroscope data and determine, from the combined information, information about a displacement of the user with an increased information content as compared to the information contained in the accelerometer data and the gyroscope data. To illustrate, the accelerometer data may be indicative of an acceleration of a mass included in accelerometer 137. The gyroscope data may be indicative of a change of orientation of a mass included in gyroscope 148. Combining the information in the accelerometer data with the information in the gyroscope data can thus yield information about whether an acceleration of the user's head may coincide with a change of orientation of the user's head.

In particular, the accelerometer data may be indicative of an acceleration relative to three different orthogonal spatial axes. In this way, a rotation of the user's head may be indicated by the accelerometer data. However, combining the rotation information in the accelerometer data with the orientation change information in the gyroscope data can improve the accuracy of the rotational measurement of the user's head movement. To this end, in some implementations, the accelerometer data may be correlated with the gyroscope data and the information may be combined depending on a degree of correlation. E.g., when the accelerometer data is indicative of an acceleration relative to two or three different orthogonal spatial axes, a correlation with the information in the gyroscope data may be employed to determine whether the acceleration is related to a rotational movement of the user's head and/or to improve the accuracy of the rotational measurement. Correlating the information in the gyroscope data with the information in the accelerometer data may also be employed to synchronize the gyroscope data with the accelerometer data depending on the degree of correlation. In this way, an inertial measurement unit may be implemented, which comprises accelerometer 137 on one side of the user's head and gyroscope 148 on the other side of the user's head. The inertial measurement unit can thus provide the information about a displacement of the user with an increased accuracy and/or content as compared to the information contained in only one of the accelerometer data and the gyroscope data.

Furthermore, by implementing accelerometer 137 as the first sensor and gyroscope 148 as the second sensor of hearing system 400, a desired power consumption of hearing system 400 may be realized. E.g., operating accelerometer 137 may require less energy than operating gyroscope 148. The power consumption of hearing system 400 may thus be steered to a desired level by operating gyroscope 148 less frequent, e.g., at a lower sampling rate, as compared to accelerometer 137.

Figure 5:
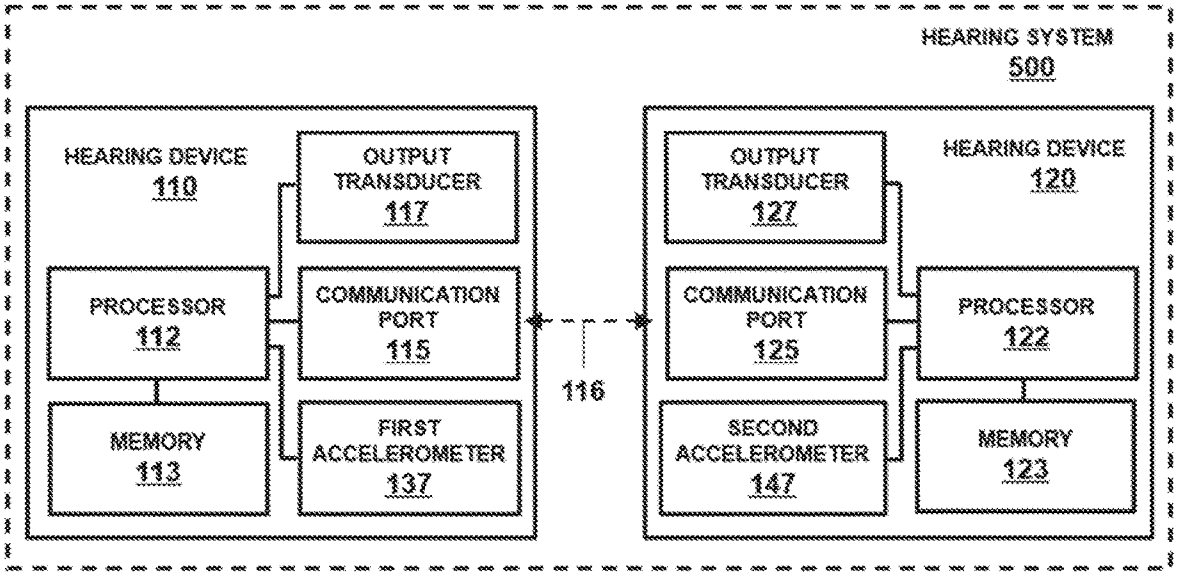

FIG. 5 illustrates another exemplary hearing system 500 by which hearing system 100 illustrated in FIG. 1 may be implemented. In the illustrated example, first sensor unit 119 of first hearing device 110 is implemented as first accelerometer 137. Second sensor unit 119 of second hearing device 120 is implemented as second accelerometer 147. The first accelerometer data provided by first accelerometer 137 and the second accelerometer data provided by second accelerometer 147 can be received by processing unit 112, 113 via communication ports 115, 125. Processing unit 112, 113 can then combine information contained in the first and second accelerometer data and determine, from the combined information, information about a displacement of the user with an increased information content as compared to the information contained in the first and second accelerometer data.

In some implementations, first accelerometer 137 is configured to provide the first accelerometer data at a first sampling rate and second accelerometer 147 is configured to provide the second accelerometer data at a second sampling rate different from the first sampling rate. By combining the information in the first and second accelerometer data, an aliasing of information contained in one of the first and second accelerometer data may be avoided and the accuracy about the information about the displacement of the user may be improved by employing the information in the first and second accelerometer data which has the higher accuracy. E.g., the information provided in the accelerometer data at the lower sampling rate may have a higher accuracy, at least below the Nyquist frequency, as compared to the accelerometer data provided at the higher sampling rate. Moreover, a desired power consumption of hearing system 500 may be realized when operating the accelerometer 137, 147 at the lower sampling rate requires less energy than operating the accelerometer 137, 147 at the higher sampling rate, wherein, e.g., the accelerometer 137, 147 operated at the lower sampling rate may be continuously operated and the accelerometer 137, 147 operated at the lower sampling rate may be operated in a non-continuous manner, e.g., within recurring periods.

In some implementations, first accelerometer 137 is configured to provide the first accelerometer data at a first measurement range of at least 1 g, and second accelerometer 147 is configured to provide the second accelerometer data at a second measurement range different from the first measurement range of at most 250 g. E.g., the first measurement range may be below 250 g and/or the second measurement range may be above 1 g. Combining the information of the two different measurement ranges can thus be exploited to increase the information content in the combined data as compared to the first and second accelerometer data.

Figure 6:
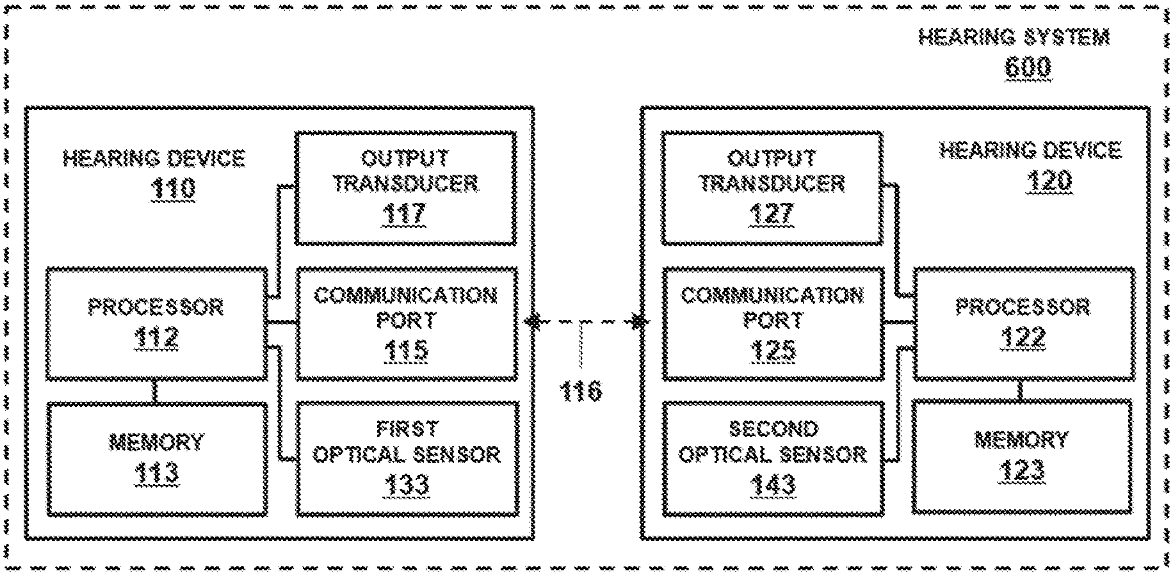

FIG. 6 illustrates another exemplary hearing system 600 by which hearing system 100 illustrated in FIG. 1 may be implemented. In the illustrated example, first sensor unit 119 of first hearing device 110 is implemented as first optical sensor 133. Second sensor unit 119 of second hearing device 120 is implemented as second optical sensor 143. The first optical sensor data provided by first optical sensor 133 and the second optical sensor data provided by second optical sensor 133 can be received by processing unit 112, 113 via communication ports 115, 125. Processing unit 112, 113 can then combine information contained in the first and second optical sensor data and determine, from the combined information, information about a property of the user with an increased information content as compared to the information contained in the first and second optical sensor data.

First optical sensor 133 comprises a first light source configured to emit light toward the first car, and a first light detector configured to detect a reflected and/or scattered part of the light. Second optical sensor 143 comprises a second light source configured to emit light toward the second ear, and a second light detector configured to detect a reflected and/or scattered part of the light. The first light source can be configured to emit the light at a first wavelength and/or the first light detector can be configured to detect the reflected and/or scattered part of the light at the first wavelength. The second light source can be configured to emit light toward the second car at a second wavelength different from the first wavelength, and a second light detector configured to detect a reflected and/or scattered part of the light at the second wavelength. The first optical sensor data can be indicative of the light detected by the first light detector, and the second optical sensor data can be indicative of the light detected by the second light detector.

To illustrate, the first and second optical sensor 133, 143 may each be implemented as a photoplethysmography (PPG) sensor. The first optical sensor data and/or the second optical sensor data may then be indicative of a physiological property of the user such as, e.g., a heart rate and/or a blood pressure and/or a heart rate variability (HRV) and/or an oxygen saturation index (SpO2) and/or a maximum rate of oxygen consumption (VO2max), and/or a concentration of an analyte contained in the tissue, such as water and/or glucose. For instance, the first light source may configured to emit light at the first wavelength absorbable by a first analyte, e.g., water, and the second light source may configured to emit light at the second wavelength absorbable by a second analyte, e.g., glucose or hemoglobin.

Correspondingly, the first light detector may be configured to detect a reflected and/or scattered part of the light at the first wavelength which has not been absorbed by the first analyte, and the second light detector may be configured to detect a reflected and/or scattered part of the light at the second wavelength which has not been absorbed by the second analyte. In this way, by combining the first and second optical sensor data, a property related to the first and second analyte can be determined from the combined first and second optical sensor data, whereas the first and second optical sensor data each only contain information about a presence of one of the first and second analyte in the user's blood.

Figure 7:
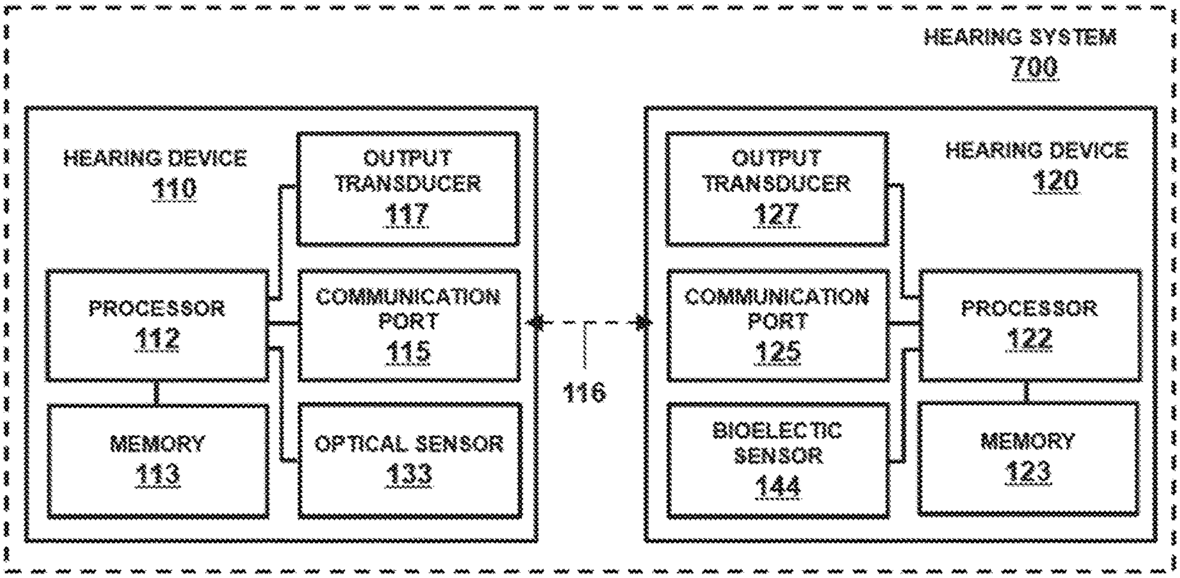

FIG. 7 illustrates another exemplary hearing system 700 by which hearing system 100 illustrated in FIG. 1 may be implemented. In the illustrated example, first sensor unit 119 of first hearing device 110 is implemented as optical sensor 133. Second sensor unit 119 of second hearing device 120 is implemented as bioelectric sensor 144. The optical sensor data provided by optical sensor 133 and the bioelectric sensor data provided by bioelectric sensor 144 can be received by processing unit 112, 113 via communication ports 115, 125.

Processing unit 112, 113 can then combine information contained in the optical sensor data with information contained in the bioelectric sensor data and determine, from the combined information, information about a property of the user with an increased information content as compared to the information contained in the optical sensor data and in the bioelectric sensor data.

For example, optical sensor 133 may be implemented as a photoplethysmography (PPG) sensor, as described above. Bioelectric sensor 144 may be implemented as a electrocardiogram (ECG) sensor. In some implementations, the optical sensor data and the bioelectric sensor data may be indicative of a corresponding physiological property of the user such as, e.g., a heart rate. By combining the information in the optical sensor data with the information in the bioelectric sensor data, the physiological property of the user may be determined at a higher accuracy as compared to the information contained in the optical sensor data and/or in the bioelectric sensor data. In some implementations, the optical sensor data and the bioelectric sensor data may be indicative of a different physiological property of the user. To illustrate, the information contained in the optical sensor data may be employed to determine a first physiological property of the user such as, e.g., a blood pressure and/or an analyte concentration in the user's blood, and the information contained in the bioelectric sensor data may be employed to determine a second physiological property of the user such as, e.g., a heart rate. By combining the information in the optical sensor data with the information in the bioelectric sensor data, the information content about one or more physiological properties of the user can thus be enhanced as compared to the information contained in the optical sensor data and/or in the bioelectric sensor data.

Figure 8:
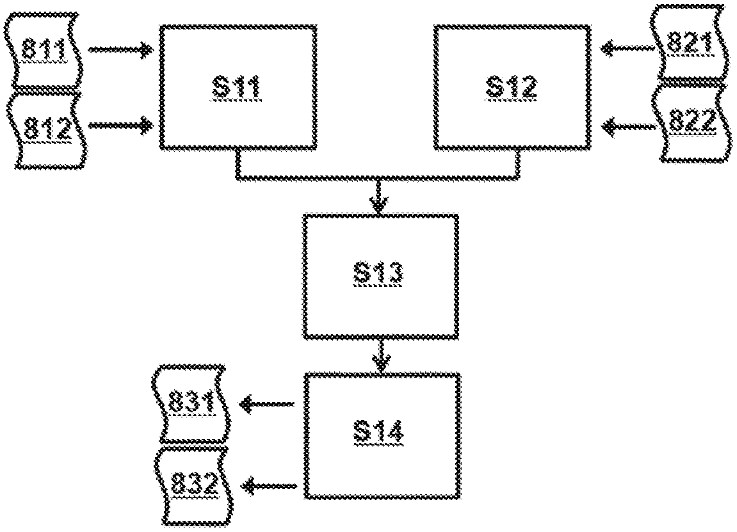
FIGS. 8-11 schematically illustrate some exemplary methods of processing sensor data in a hearing system according to principles described herein.

FIG. 8 illustrates a block flow diagram for an exemplary method of processing sensor data generated by hearing system 100, 400, 500, 600, 700. The method may be executed by processor 112 of hearing device 110 and/or processor 122 of hearing device 120 and/or another processor communicatively coupled to processor 112, 122, e.g., a processor included in a communication device or a portable device, such as a smartphone or a smartwatch, communicatively coupled to hearing device 110 and/or hearing device 120. At operation S11, first sensor data 811 indicative of a displacement of first hearing device 110 and/or first sensor data 812 indicative of a property detected on the user at the location of the first hearing device 110 is received. At operation S12, second sensor data 821 indicative of a displacement of second hearing device 120 and/or second sensor data 822 indicative of a property detected on the user at the location of the second hearing device 120 is received. First sensor data 811, 812 comprises an information content differing from information contained in second sensor data 821, 822.

At operation S13, information contained in first sensor data 811, 812 is combined with information contained in second sensor data 821, 822. Combining the information contained in first sensor data 811, 812 and the information contained in second sensor data 821, 822 may comprise, e.g., including both the information contained in first sensor data 811, 812 and the information contained in second sensor data 821, 822 in the combined information and/or including an average value of the information contained in first sensor data 811, 812 and the information contained in second sensor data 821, 822 in the combined information and/or selecting one of the information contained in first sensor data 811, 812 and the information contained in second sensor data 821, 822 to be included in the combined information and/or scaling one or both of the information contained in first sensor data 811, 812 and the information contained in second sensor data 821, 822 relative to information contained in the other of first sensor data 811, 812 and second sensor data 821, 822 in order to be included in the combined information and/or performing any other mathematical operation with the information contained in first sensor data 811, 812 and the information contained in second sensor data 821, 822 in order to be included in the combined information.

At operation S14, information 831 about a displacement of the user and/or information 832 about the property detected on the user is determined from the combined information. Relative to the information contained in first sensor data 811, 812 and the information contained in second sensor data 821, 822, information 831, 832 can be determined with an improved accuracy and/or with an increased information content. Information 831, 832 may then be outputted and/or employed to control an operation of hearing device 110, 120 depending on information 831, 832. E.g., a beamforming of a sound detected by input transducer 117 may be performed depending on information 831 about the displacement of the user. E.g., an output level of a sound outputted by output transducer 117, 117 may be steered depending on information 832 about the property detected on the user, such as a physiological property. E.g., an emergency phone call may be initiated depending on information 832 about the property detected on the user, such as a physiological property which may comprise, for instance, a heart rate and/or blood pressure of the user, and/or depending on information 831 about the displacement of the user which may comprise, for instance, information whether the user has fallen down.

Figure 9:
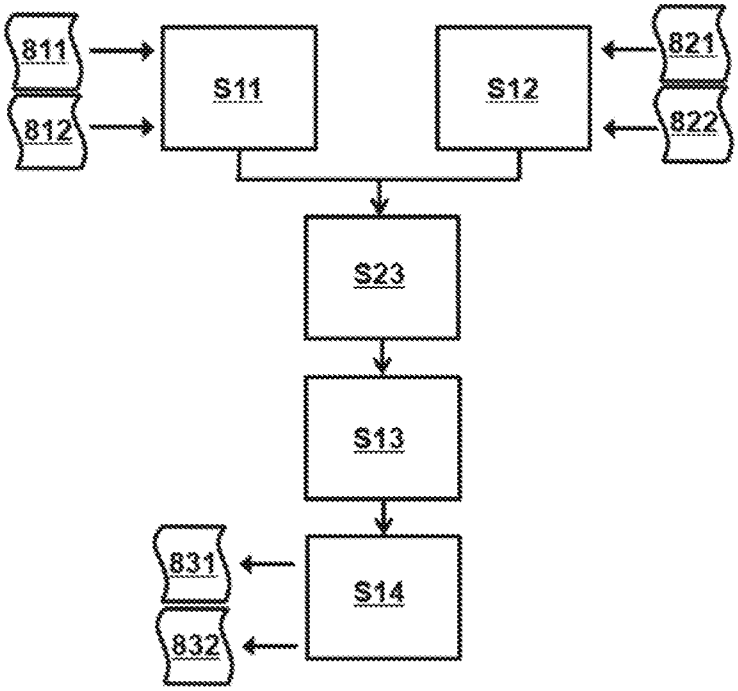
Figure 10:
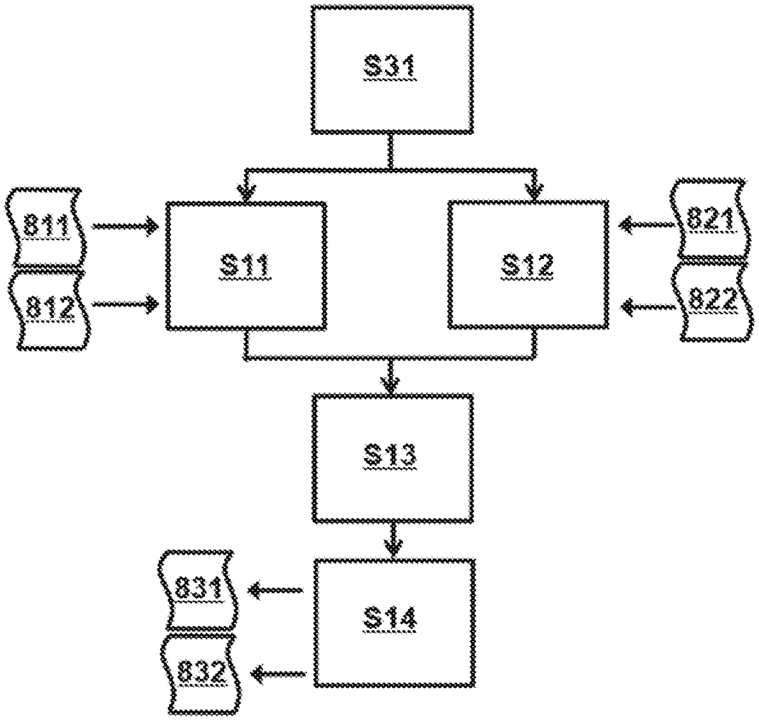

FIG. 9 illustrates a block flow diagram for another exemplary method of processing sensor data generated by hearing system 100, 400, 500, 600, 700. At operation S23, after receiving first sensor data 811, 812 at S11 and receiving second sensor data 821, 822 at S12, a degree of correlation between the information contained in first sensor data 811, 812 and the information contained in second sensor data 821, 822 is determined. At S13, the information contained in first sensor data 811, 812 and the information contained in second sensor data 821, 822 is combined depending on the degree of correlation determined at S23. To illustrate, when the degree of correlation between the information contained in first sensor data 811, 812 and the information contained in second sensor data 821, 822 is determined at S23 to be above a threshold, the information contained in first sensor data 811, 812 and the information contained in second sensor data 821, 822 may be combined at S13. When the degree of correlation between the information contained in first sensor data 811, 812 and the information contained in second sensor data 821, 822 is determined at S23 to be below the threshold, the information contained in first sensor data 811, 812 and the information contained in second sensor data 821, 822 may not be combined at S13. Combining the information depending on the degree of correlation such as, e.g., a temporal correlation, can allow to provide information 831 about the displacement of the user and/or information 832 about the property detected on the user with an improved accuracy. E.g., when the degree of correlation is determined to exceed the threshold at S23, the information contained in first sensor data 811, 812 and the information contained in second sensor data 821, 822 may be combined at S13 by determining an average value of the information at S13 and/or selecting the information with the higher accuracy and/or performing any other mathematical operation with the information. In particular, by correlating the information contained in first sensor data 811, 812 and the information contained in second sensor data 821, 822 at S23, the information in the first and second sensor data 811, 812, 821, 822 can by synchronized and/or information in the first and second sensor data 811, 812, 821, 822 which is related to each other, as determined by the degree of correlation above the threshold, FIG. 10 illustrates a block flow diagram for another exemplary method of processing sensor data generated by hearing system 100, 400, 500, 600, 700. At operation S31, first sensor 131, 136 is controlled to provide first sensor data 811, 812 and/or second sensor 141, 146 is controlled to provide second sensor data 821, 822. In some implementations, first hearing device 110 comprises a first battery 227 and second hearing device 120 comprises a second battery 227, wherein first sensor 131, 136 and/or second sensor 141, 146 is controlled to provide first sensor data 811, 812 and/or second sensor data 821, 822 depending on a battery status of first battery 227 included in first hearing device 110 and/or second battery 227 included in second hearing device 120. In some implementations, first sensor 131, 136 may be configured to spend less energy during providing first sensor data 811, 812 than second sensor 141, 146 during providing second sensor data 821, 822, wherein second sensor 141, 146 may be controlled to provide second sensor data 821, 822 less often than first sensor 131, 136 to provide first sensor data 811, 812. In some implementations, first sensor 131, 136 and second sensor 141, 146 are controlled to provide first sensor data 811, 812 and second sensor data 821, 822 within a predetermined time window. In particular, when providing first sensor data 811, 812 and second sensor data 821, 822 within the predetermined time window, the information in the first and second sensor data 811, 812, 821, 822 can be synchronized in the combined information, for instance after a degree of temporal correlation between the information contained in first sensor data 811, 812 and information contained in second sensor data 821, 822 is determined at S23, as described above.

Figure 11:
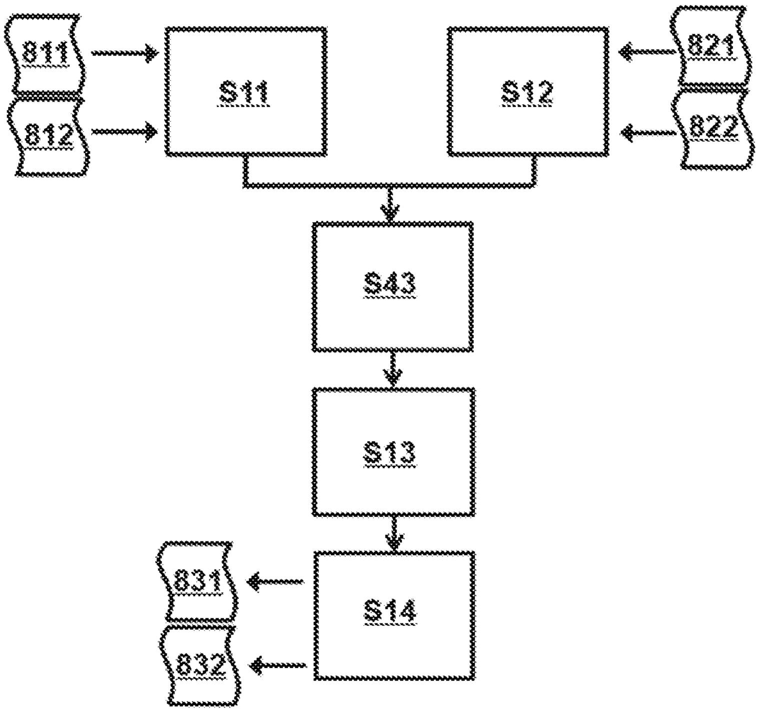

FIG. 11 illustrates a block flow diagram for another exemplary method of processing sensor data generated by hearing system 100, 400, 500, 600, 700. At operation S43, a quality factor of the information contained in first sensor data 811, 812 and a quality factor of the information contained in second sensor data 821, 822 is determined. In some instances, one of the information contained in first sensor data 811, 812 and the information contained in second sensor data 821, 822 is selected to be included in the information combined at S13 depending on the quality factor and the other of the information contained in first sensor data 811, 812 and the information contained in second sensor data 821, 822 is discarded in the information combined at S13 depending on the quality factor. In some instances, one of the information contained in first sensor data 811, 812 and the information contained in second sensor data 821, 822 is weighted to a different degree in the information combined at S13 than the other of the information contained in first sensor data 811, 812 and the information contained in second sensor data 821, 822 depending on the quality factor. The quality factor determined at S43 can indicate whether the information contained in first sensor data 811, 812 and/or the information contained in second sensor data 821, 822 fulfills a predetermined quality criterion.

E.g., when the information contained in first sensor data 811, 812 and the information contained in second sensor data 821, 822 comprises information about the property detected on the user, first displacement data 811 and/or second displacement data 821 may be used as an indicator of a quality of the information about the property detected on the user. To illustrate, when first displacement data 811 indicates a rather large movement of first hearing device 110, the measurement of the property detected on the user performed by first sensor 131, 136 may be compromised by the movement. Accordingly, the quality factor of the information contained in first sensor data 811, 812 determined at S43 may be assigned to a rather low value. Correspondingly, when second displacement data 821 indicates a rather large movement of second hearing device 120, the measurement of the property detected on the user performed by second sensor 141, 146 may be compromised by the movement. Accordingly, the quality factor of the information contained in second sensor data 821, 822 determined at S43 may be assigned to a rather low value.

To illustrate, when a correlation of first displacement data 811 and second displacement data 821 at S23 indicates that a degree of correlation between first displacement data 811 and second displacement data 821 is below the threshold, one of the information contained in first sensor data 811, 812 and the information contained in second sensor data 821, 822 may be discarded and/or weighted to a different degree in the information combined at S13. E.g., when first displacement data 811 or second displacement data 821 indicates a larger movement of first hearing device 110 or second hearing device 120, at least one of the information contained in first sensor data 811, 812 and the information contained in second sensor data 821, 822 may be discarded and/or weighted to a different degree in the information combined at S13 for which the first displacement data 811 or the second displacement data 821 indicates the larger movement.

Combining the information contained in first sensor data 811, 812 and the information contained in second sensor data 821, 822 in such a way, i.e., by discarding one of the information contained in first sensor data 811, 812 and the information contained in second sensor data 821, 822 in the combined sensor data or by weighting one of the information contained in first sensor data 811, 812 and the information contained in second sensor data 821, 822 to a different degree in the combined information can allow to improve the accuracy of the information provided in the combined sensor data. By combining the information in such a way, the information contained in first sensor data or second sensor data 811, 812, 821, 822 which has been selected at S13 to be included in the combined sensor data or to be weighted to a higher degree in the combined sensor data can be validated as being more accurate as compared to the information contained in first sensor data or second sensor data 811, 812, 821, 822 which has been discarded or weighted to a lower degree in the combined sensor data due to the lower quality factor.

While the principles of the disclosure have been described above in connection with specific devices and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A hearing system comprising:

a first hearing device configured to be worn at a first ear of a user, the first hearing device comprising a first sensor configured to provide first sensor data indicative of a displacement of the first hearing device and/or a property detected on the user at a location of the first hearing device;

a second hearing device configured to be worn at a second ear of the user, the second hearing device comprising a second sensor configured to be activated to provide second sensor data indicative of a displacement of the second hearing device and/or a property detected on the user at a location of the second hearing device; and a processing unit communicatively coupled to the first and second sensor, characterized in that the first sensor is configured to provide an information content in the first sensor data differing from an information content in the second sensor data, and the processing unit is configured to cause the first sensor to provide the first sensor data while the second sensor is deactivated;

derive a condition of the user from the first sensor data;

activate, based on the condition derived from the first sensor data, the second sensor to begin providing the second sensor data only after the condition is derived;

combine the information content in the first sensor data with the information content in the second sensor data; and determine, from the combined information, information about a displacement of the user and/or the property detected on the user.

2. The hearing system of claim 1, wherein the processing unit is further configured to determine a degree of correlation between the information contained in the first sensor data and the information contained in the second sensor data, wherein the information is combined depending on the degree of correlation.

3. The hearing system of claim 1, wherein the first sensor includes a first sensor element sensitive to said displacement of the first hearing device and/or the property detected on the user at the location of the first hearing device which is different from a second sensor element included in the second sensor sensitive to said displacement of the second hearing device and/or the property detected on the user at the location of the second hearing device.

4. The hearing system of claim 3, wherein the first hearing device differs from the second hearing device in that the first sensor element is only included in the first hearing device.

5. The hearing system of claim 1, wherein:

the first sensor is an accelerometer configured to provide said first sensor data as accelerometer data indicative of an acceleration of a mass included in the accelerometer; and the second sensor is a gyroscope configured to provide said second sensor data as gyroscope data indicative of a change of orientation of a mass included in the gyroscope.

6. The hearing system of claim 1, wherein:

the first sensor is a first optical sensor configured to provide said first sensor data as first optical sensor data, the optical sensor comprising a first light source configured to emit light toward the first ear, and a first light detector configured to detect a reflected and/or scattered part of the light, the first optical sensor data indicative of the light detected by the first light detector; and the second sensor is a second optical sensor configured to provide said second sensor data as second optical sensor data, the second optical sensor comprising a second light source configured to emit light toward the second ear and a second light detector configured to detect a reflected and/or scattered part of the light, the second optical sensor data indicative of the light detected by the second light detector, wherein the first light source is configured to emit the light at a first wavelength and the second light source is configured to emit the light at a second wavelength different from the first wavelength and/or the first light detector is configured to detect the reflected and/or scattered part of the light at the first wavelength and the second light detector is configured to detect the reflected and/or scattered part of the light at the second wavelength different from the first wavelength.

7. The hearing system of claim 1, wherein:

the first sensor is configured to provide said first sensor data at a first sampling rate; and the second sensor is configured to provide said second sensor data at a second sampling rate different from the first sampling rate.

8. The hearing system of claim 1, wherein:

the first sensor is a first accelerometer configured to provide said first sensor data as first accelerometer data indicative of an acceleration of a mass included in the first accelerometer at a first measurement range including a value of at least 1 g; and the second sensor is a second accelerometer configured to provide said second sensor data as second accelerometer data indicative of an acceleration of a mass included in the second accelerometer at a second measurement range different from the first measurement range including a value of at most 250 g.

9. The hearing system of claim 1, wherein the processing unit is configured to control the first sensor and/or the second sensor to provide the first sensor data and/or the second sensor data.

10. The hearing system of claim 9, wherein the first hearing device comprises a first battery and the second hearing device comprises a second battery, wherein the processing unit is configured to control the first sensor and/or the second sensor depending on a battery status of the first battery and/or the second battery.

11. The hearing system of claim 9, wherein the first sensor is configured to spend less energy during providing the first sensor data than the second sensor during providing the second sensor data, wherein the processing unit is configured to control the second sensor to provide the second sensor data less often than the first sensor providing the first sensor data.

12. The hearing system of claim 9, wherein the processing unit is configured to control the first sensor and the second sensor to provide the first sensor data and the second sensor data within a predetermined time window.

13. The hearing system of claim 1, wherein the processing unit is further configured to determine a quality factor of the information contained in the first sensor data and a quality factor of the information contained in the second sensor data, wherein one of the information contained in the first sensor data and the information contained in the second sensor data is discarded and/or weighted to a different degree than the other of the information contained in the first sensor data and the information contained in the second sensor data depending on the quality factor of the information contained in the first sensor data and/or the quality factor of the information contained in the second sensor data.

14. The hearing system of claim 1, wherein:

the first sensor comprises an accelerometer;

the first sensor data comprises accelerometer data;

the second sensor comprises an inertial measurement unit (IMU) comprising an accelerometer and a gyroscope;

the deriving the condition from the first sensor data comprises determining that the accelerometer data is indicative of a head motion of the user; and the activating the second sensor comprises activating the IMU to provide IMU data.

15. The hearing system of claim 1, wherein the processing unit is further configured to use the combined information to perform an operation with respect to at least one of the first hearing device, the second hearing device, or the user.

16. The hearing system of claim 15, wherein the operation comprises at least one of steering a beamformer or detecting user input provided by the user.

17. A method of operating a hearing system, the hearing system comprising:

a first hearing device configured to be worn at a first ear of a user, the first hearing device comprising a first sensor configured to provide first sensor data indicative of a displacement of the first hearing device and/or a property detected on the user at a location of the first hearing device; and a second hearing device configured to be worn at a second ear of the user, the second hearing device comprising a second sensor configured to be activated to provide second sensor data indicative of a displacement of the second hearing device and/or a property detected on the user at a location of the second hearing device, characterized in that the first sensor is configured to provide an information content in the first sensor data differing from an information content in the second sensor data, and the method comprises:

causing the first sensor to provide the first sensor data while the second sensor is deactivated;

deriving a condition of the user from the first sensor data;

activating, based on the condition derived from the first sensor data, the second sensor to begin providing the second sensor data only after the condition is derived;

combining the information content in the first sensor data with the information content in the second sensor data; and determining, from the combined information, information about a displacement of the user and/or the property detected on the user.

18. A computer-readable medium storing instructions that, when executed by a processing unit included in a hearing system, cause the processing unit to perform the method according to claim 17.

* * * * *